United States Patent [19]
Yoshimori et al.

[11] Patent Number: 4,998,175
[45] Date of Patent: Mar. 5, 1991

[54] TRANSDUCER-TO-MEDIUM STABILIZING DEVICE HAVING A STATIC PRESSURE RELEASING ARRANGEMENT FOR MAINTAINING THE TRANSDUCER IN A STABLE CONTACT RELATIONSHIP WITH A RECORDING MEDIUM

[75] Inventors: Hiroyuki Yoshimori; Tatsuo Imamura, both of Kanagawa; Akira Katoh; Shinichi Harada, both of Hachioji, all of Japan

[73] Assignee: Olympus Optical Co., Ltd., Japan

[21] Appl. No.: 323,425

[22] Filed: Mar. 14, 1989

[30] Foreign Application Priority Data

Mar. 18, 1988 [JP] Japan ................................. 63-64794
Jul. 14, 1988 [JP] Japan ............................... 63-176280
Jul. 26, 1988 [JP] Japan ............................... 63-186100
Feb. 28, 1989 [JP] Japan ................................... 1-48259

[51] Int. Cl.$^5$ ..................... G11B 15/60; G11B 5/012
[52] U.S. Cl. ............................. 360/130.34; 360/102; 360/104; 360/130.3
[58] Field of Search .............. 360/106, 107, 109, 102, 360/103, 104, 105, 130.34, 130.3, 97.01, 97.04, 99.01

[56] References Cited

U.S. PATENT DOCUMENTS

| | | | |
|---|---|---|---|
| 4,375,656 | 3/1983 | Radman, Jr. et al. | 360/102 X |
| 4,620,250 | 10/1986 | Hills | 360/102 |
| 4,652,959 | 3/1987 | Hamada | 360/130.34 |
| 4,652,960 | 3/1987 | MacDonald II | 360/130.34 |
| 4,670,806 | 6/1987 | Ghose | 360/103 X |
| 4,734,809 | 3/1988 | Inuma et al. | 360/99 |
| 4,809,105 | 2/1989 | Imanisli et al. | 360/104 X |
| 4,858,043 | 8/1989 | Kadokura et al. | 360/130.34 |

FOREIGN PATENT DOCUMENTS

| | | | |
|---|---|---|---|
| 54-17708 | 2/1979 | Japan | 360/102 |
| 58-15870 | 3/1983 | Japan . | |
| 59-54071 | 3/1984 | Japan . | |
| 59-215073 | 12/1984 | Japan | 360/130.34 |
| 60-61950 | 4/1985 | Japan | 360/130.34 |
| 61-224174 | 10/1986 | Japan | 360/99 |

OTHER PUBLICATIONS

IBM Tech. Discl. Bull., vol. 20, No. 3, Aug. 77, pp. 1130–1131, "Transducer Support***" by Orlando et al.
IBM Tech. Discl. Bull., vol. 20, No. 3, Aug. 77, pp. 1132–1133, "Transducer Head for Multiple Flex Disk Pack" by Weidenhammer.

Primary Examiner—John H. Wolff
Assistant Examiner—Alfonso Garcia
Attorney, Agent, or Firm—Louis Weinstein

[57] ABSTRACT

A transducer-to-medium stabilizer assembled with a transducer in a recording and/or reproducing apparatus is disposed in an opposing relationship with a flexible storage disk which is used as an information recording medium. The stabilizer comprises first and second block members which protrude from a base block member and a static pressure releasing arrangement on said stabilizer device. When the flexible storage disk is rotated at a high speed with respect to the stabilizer device, a negative pressure is formed between the stabilizer device and the disk, resulting in that the transducer is maintained in a constant and stable contact relationship with the disk.

26 Claims, 17 Drawing Sheets

TRANSDUCER-TO-MEDIUM STABILIZING DEVICE HAVING A STATIC PRESSURE RELEASING ARRANGEMENT FOR MAINTAINING THE TRANSDUCER IN A STABLE CONTACT RELATIONSHIP WITH A RECORDING MEDIUM

FIELD OF THE INVENTION AND RELATED ART STATEMENT

The present invention relates to a transducer-to-medium stabilizing device and in particular to a transducer-to-medium stabilizing device for contacting a recording/reproducing head which is used as a transducer with a magnetic recording medium in a stable and intimate manner.

In a magnetic recording/reproducing device for recording and/or reproducing video information and the like using a recording medium comprising a flexible magnetic disk which is in the form of a circular sheet, the recording medium is rotated at a high speed with respect to a magnetic head to obtain high quality recorded and reproduced video signals. The magnetic head is brought into sliding contact with a magnetic surface of the recording medium which is rotating at a high speed (for example, 3600 rpm) to accomplish high quality video recording and reproducing. Techniques to obtain a stable head contact with a recording medium during sliding contact with the recording medium with the head at a constant pressure includes two types of techniques, such as a positive pressure system and a negative pressure system. The former system involves disposing a hard pad at an opposite side of a recording medium with respect to the magnetic head, so that a positive pressure is formed by an air stream formed between the pad and a sheet to bring the head into a pressure contact with the sheet. The latter system involves disposing a contact stabilizing device (referred to as sucking ring) having a magnetic head embedded at the center thereof and an annular recess surrounding the head so that the device is movable in a radial direction in an opposing manner with respect to the magnetic surface of the recording medium, forming a negative pressure by an airstream formed when the recording medium is rotated at a high speed and forming a sucking pressure to suck the recording medium toward the head by the negative pressure.

FIG. 28 shows an example of a conventional recording medium regulating device for recording and reproducing video information on and from the recording medium by slide contacting the flexible magnetic recording medium with the head in accordance with the above negative pressure system. In the drawing, the recording medium 1 having a magnetic coating at the underside thereof which is formed into a circular sheet is provided with a chucking center hub 4 at the center thereof. The center hub 4 is chucked to a spindle shaft 6a of a spindle motor 6. The thus chucked recording medium 1 is rotated clockwise at a high speed by means of motor 6. A carriage 5 is disposed in a parallel relationship with the recording medium therebelow. A contact stabilizing device 3 is disposed on the upper side of the carriage 5 in the vicinity of one side thereof (a left side end as viewed in the drawing). A magnetic head 2 disposed at the center of the slide contact device 3 is adapted to contact with the lower magnetic coating of the recording medium 1.

The carriage 5 is adapted to move in a radial direction (a direction shown by an arrow a in the drawing.) by an access motor 7 secured to a chassis board (not shown) disposed below the carriage 5. That is, a lead screw (not shown) is mounted on a rotary shaft of the access motor 7. The lead screw is screwed into a screw hole (not shown) for moving the carriage 5. Accordingly when the motor 7 is driven, the carriage 5 is moved by the lead screw in a direction shown by the arrow a along a guide shaft 8 disposed at one side (front side as viewed in the drawing) of the carriage 5 to cause the magnetic head to slide in a radial direction of the recording medium for accessing the head 2 to a desired track on the recording medium. A stabilizing guide plate 9 which makes it easy to slide contact the recording medium with the magnetic head 2 of the contact stabilizing device at the start of rotation of the recording medium 1 is mounted on a stud (not shown) secured to the chassis board. The stabilizing guide plate 9 slides on the upper surface of the recording medium 1 upstream with respect to the stabilizing device 3.

In order to record and/or reproduce the video information on and/or from the recording medium 1 by means of the magnetic head 2 using the thus formed conventional recording medium regulating device, the center hub 4 of the recording medium 1 is chucked to the spindle shaft 6a of the spindle motor 6 and the spindle motor 6 is rotated. The recording medium 1 is thus rotated at a high speed. A negative pressure is formed between the recording medium 1 and the contact stabilizing device 3 so that the negative pressure causes the recording medium 1 to be sucked to the contact stabilizing device 3 so that the magnetic head 2 embedded in the device 3 slides on the recording medium 1.

A conventional contact stabilizing device used as a recording medium regulating device generally forms spaces around a magnetic head and is disposed in an opposing relationship with a recording medium together with the head as is disclosed in, for example, Japanese Laid-Open Patent Application No. Sho 59-54071. When the recording medium moves, the air in the spaces is entrained by the moving recording medium to flow away from the spaces. Since a smaller amount of air flows into the spaces than the amount of air which flows away from the spaces, a negative pressure is formed in the spaces. The moving recording medium is sucked toward the contact stabilizing device so that it slides on the magnetic head in an intimate contact relationship therewith.

The contour and operation of the conventional general contact stabilizing device will be described with reference to the drawing.

A magnetic head contact stabilizing device 3 shown in FIGS. 29A and 29B comprises a base block member 10, a first block member 10a at the center thereof having a head embedded hole 15 in which a magnetic head 2 is embedded, said first block member 10a being projected from the upper surface of the base block member 10 toward the recording medium 1, the upper surface of the base block member 10a being a first medium sliding contact surface 12, an annular groove 13 formed around the first block member 10a, and a second annular block member 10b around the groove 13 which projects from the base block member 10 toward the recording medium, the upper surface of the second block member 10b being a second medium sliding contact surface 14. The dimensions of various portions are as follows. The inner and outer diameter of the groove 13 $\phi_1$ and $\phi_2$ are 3.5 mm and 6 mm respectively. The outer diameter of the medium slide contact surface 14 of the second block member $\phi_3$ is 7 mm and the depth of the groove 13 is 50 μm. The spacing between the medium slide contact surface 14 of the contact stabilizing device 3 and the recording medium 1 is maintained at 1 μm.

Since an air stream is formed between the stabilizing device 3 and the recording medium 1 as is mentioned above when the recording medium 1 is moved in a direction shown by an arrow x with respect to the contact stabilizing device 3, a pressure is formed therebetween. Study by fluid dynamic simulation shows a pressure distribution between the opposing faces of the contact stabilizing device 3 and the recording medium 1 as shown in FIG. 30. In the graph of FIG. 30 showing a characteristic curve, the abscissa depicts points $P_1$ to $P_8$ along an imaginary diameter across the contact stabilizing device 3 shown in FIG. 29A, 29B and the ordinate dipicts relative pressure between the recording medium 1 and the contact stabilizing device 3.

As is apparent from the FIG. 30, the air pressure is less than the atmospheric pressure at a region (points $P_1$ to $P_6$) upstream of the moving direction of the medium slide contact surface 12 of the first block member 10a of the contact stabilizing device 3, while the pressure is positive at a region (points $P_6$ to $P_8$) of the groove 13 and the medium slide contact surface 14 of the second block member 10b downstream of the moving direction. Hence, sucking pressure between the contact stabilizing device 3 and the recording medium 1 is unstable at the downstream region and the moving of the medium becomes unstable. It is apparent from the actually measured data that the recording medium 1 vibrates to cause the medium to flutter so that it is not possible to provide a stable moving of the medium. It is considered that the formation of a positive pressure is due to the face that the air stream stays downstream of the groove 13, so that this increases the pressure at a downstream region.

A magnetic head 2 is embedded in a hole 15 at the center of the sliding contact surface 12 of the first block member 10a. The magnetic head 2 slightly projects above the surface 12. The length of projection of the magnetic head 2 is not particularly considered in this simulation. This is adapted to following embodiments and other contact stabilizing devices.

It has been clear from the actually measured data that the movement of the recording medium is unstable downstream of the moving direction. Accordingly, it has been heretofore difficult to obtain a stable contact condition between the magnetic head and the recording medium in a recording and/or reproducing apparatus having such a contact stabilizing device.

Other prior art contact stabilizing devices are disclosed in U.S. Pat. No. 4,620,250 and Japanese Published Patent Application No. Sho 58-158070. Since these devices generate both positive and negative pressures sucking force applied to a recording medium is weak and they have the same disadvantages as those of the aforementioned contact stabilizing devices.

Although the amplitude of the formed negative pressure in the contact stabilizing device depends on the relative speed of the recording medium 1 with respect to the magnetic head 2 the profiles of the formed negative pressure distribution would be substantially the same independently of the relative speed if the dimension of various parts of the contact stabilizing device 3 is determined.

FIG. 31 is a graph in which the formed negative pressure is plotted with respect to the relative moving speed of the recording medium. Solid and dotted lines $l_{100}$ and $l_{200}$ represent the pressure distribution when the relative speed is 7.5 m/s and 3.75 m/s respectively. It is apparent from the comparison of the solid line $l_{100}$ with the dotted line $l_{200}$ that the formed negative pressure is proportional to the relative speed.

Since the negative pressure formed between the recording medium 1 and the contact stabilizing device 3 is proportional to the relative speed of the recording medium 1 with respect to the magnetic head 2, that is, the rotational speed of the recording medium 1, a decrease in the rotational speed of the recording medium 1 decreases the formed pressure, resulting in an unstable head contact.

When the rotational speed of the recording medium 1 on usual recording and/or reproducing is, for example, 3600 rpm, the rotational speed of the recording medium is reduced to half speed as high as 1800 rpm in order to erase the video information recorded on the recording medium 1. Although the standards on still video floppy (SVF) specify that one field of video information is recorded on one track, one frame of video information may sometimes have to be recorded on one track. In this case, the rotational speed of the recording medium 1 should be reduced to half. Reduction of the rotational speed to half in such a manner reduces the formed negative pressure to half, resulting in an unstable head contact.

FIGS. 32A and 32B are waveform views showing envelopes of signals (generally referred to as RF signal) which are recorded on and reproduced from the recording medium 1 during one rotation of the recording medium. FIG. 32A shows a flat envelope which is obtained when the head contact is normal while FIG. 32B shows an envelope in which the reproduced signal has an abnormally lowered level when the head contact is unstable. The signal having an abnormally lowered level is generated when the head contact is not good during recording of video information or when the head contact is unstable during reproducing of video information. It is also generated when the head contact is not good during both recording and reproducing. Since such a large drop-out signal can not be reproduced in any cases, the video information corresponding to this drop-out will be lost. Even if video information which has been recorded on the recording medium 1 is erased by an erasing signal having an envelop as shown in FIG. 32B, only a portion corresponding to this drop-out can not be erased, resulting in miserasing.

OBJECT AND SUMMARY OF THE INVENTION

It is an object of the present invention to provide a transducer-to-medium stabilizing device in which the afore-mentioned disadvantages of the prior art contact stabilizing device are eliminated and a positive pressure formed between a magnetic head and a recording medium is eliminated so that contact of the magnetic head used as a transducer with the recording medium which is moving at a high speed is always stabilized.

It is another object of the present invention to provide a transducer-to-medium stabilizing device in which stable contact with a recording medium is obtained even when the rotational speed of the recording medium is changed.

In accordance with the present invention, by merely forming a simple notch downstream of a motion direction of the recording medium on a medium sliding contact surface of a second block member external to a groove, increase in pressure at a downstream region is prevented to provide a negative pressure region in such a manner that stable contact of the transducer with the recording medium which is moving at a high speed can be realized by a sucking force owing to the negative pressure.

A remarkable effect that a stable contact of the recording medium with the transducer can be obtained in spite a change in rotational speed of the recording medium by slightly inclining the opposing surface of the contact stabilizing device with respect to the motion direction of the recording medium.

DETAILED DESCRIPTION OF PREFERRED EMBODIMENTS

Figure 1A:
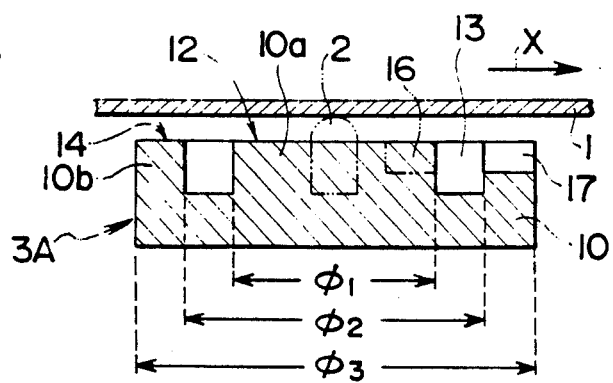
FIGS. 1A and 1B are a longitudinal cross-section showing a contact stabilizing device of a first embodiment of the present invention and a plan view showing a surface of the stabilizing device opposite a recording medium respectively.
Figure 1B:
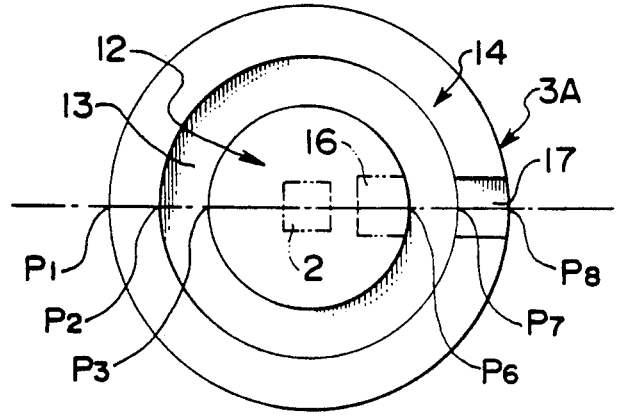

Referring now to FIGS. 1A and 1B there is shown a first embodiment of the present invention. In this embodiment which will be described herein below, a magnetic head 2 is used as a transducer.

Figure 29A:
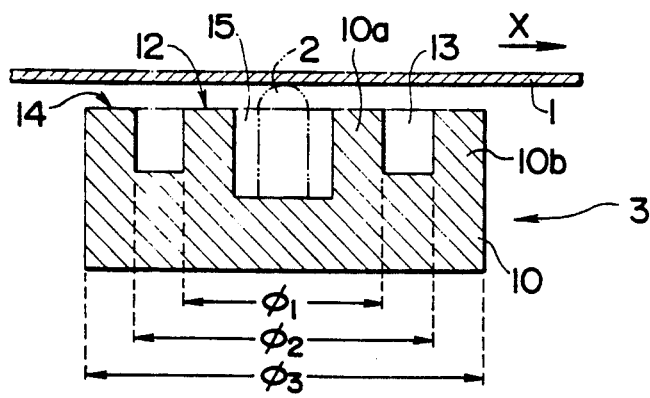
FIGS. 29A and 29B are a cross-sectional view showing a conventional typical contact stabilizing device and a top plan view showing a medium opposing surface of the device respectively.
Figure 29B:
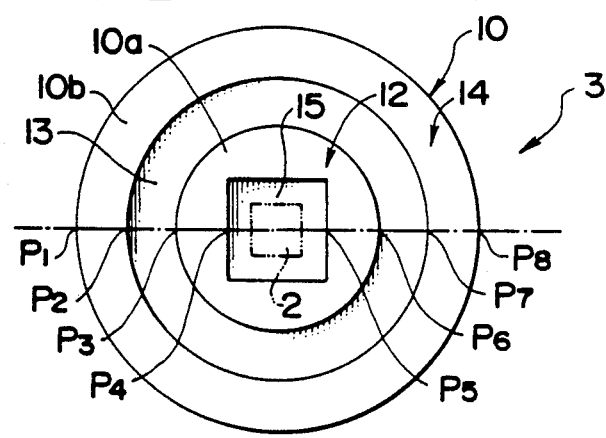
Figure 30:
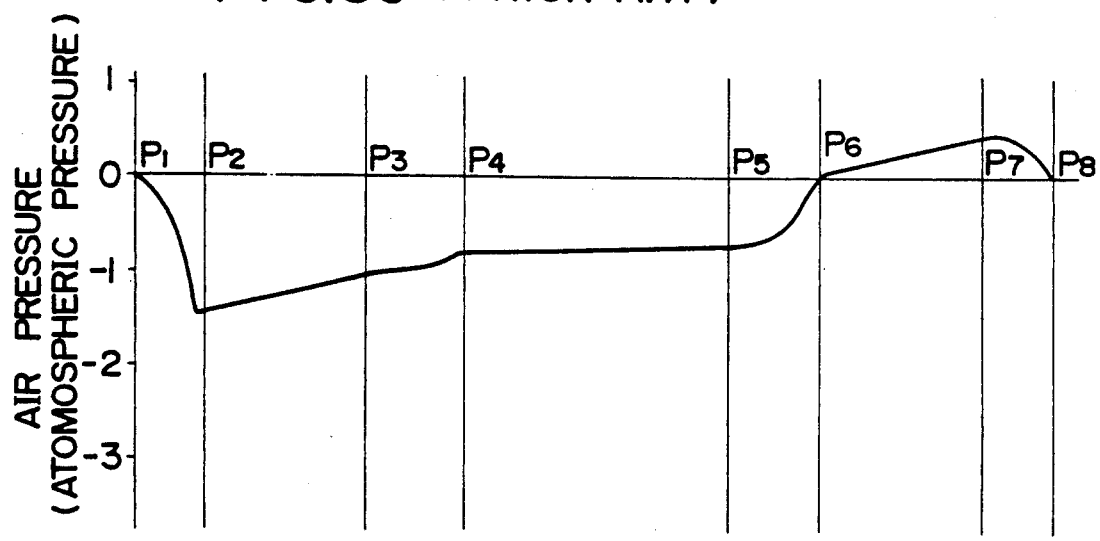
FIG. 30 is a graph showing a pressure distribution obtained when the stabilizing device of FIGS. 29A and 29B is used.
Figure 31:
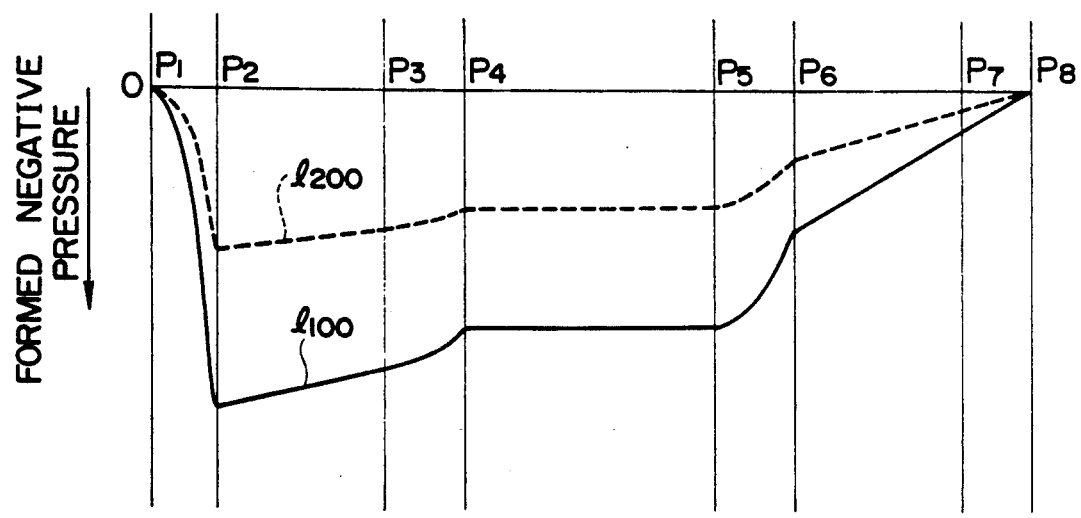
FIG. 31 is a graph showing the distributions of a negative pressure formed when the relative speed of the recording medium with respect to the magnetic head is changed.
Figure 32A:
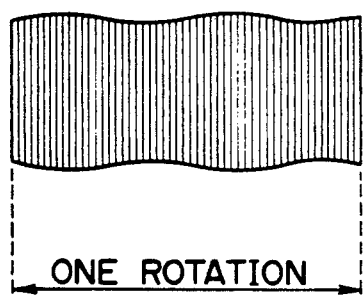
FIGS. 32A and 32B are waveform charts showing envelopes of RF signals which are recorded on or reproduced from a recording medium when the head contact is normal and unstable respectively.
Figure 32B:
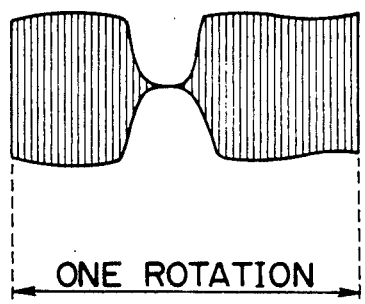

A contact stabilizing device 3A is different from the conventional stabilizing device 3 in that a notch 17 is formed on the contact surface 14 of a second block member 10b external to a groove 13 is a part of region downstream with respect to the motion direction of a recording medium 1. Repetition of the description of the portions of the device 3A which are substantially similar in shape and dimension to the conventional device shown in FIGS. 29A and 29B is omitted hereinbelow for purposes of brevity.

Figure 2:
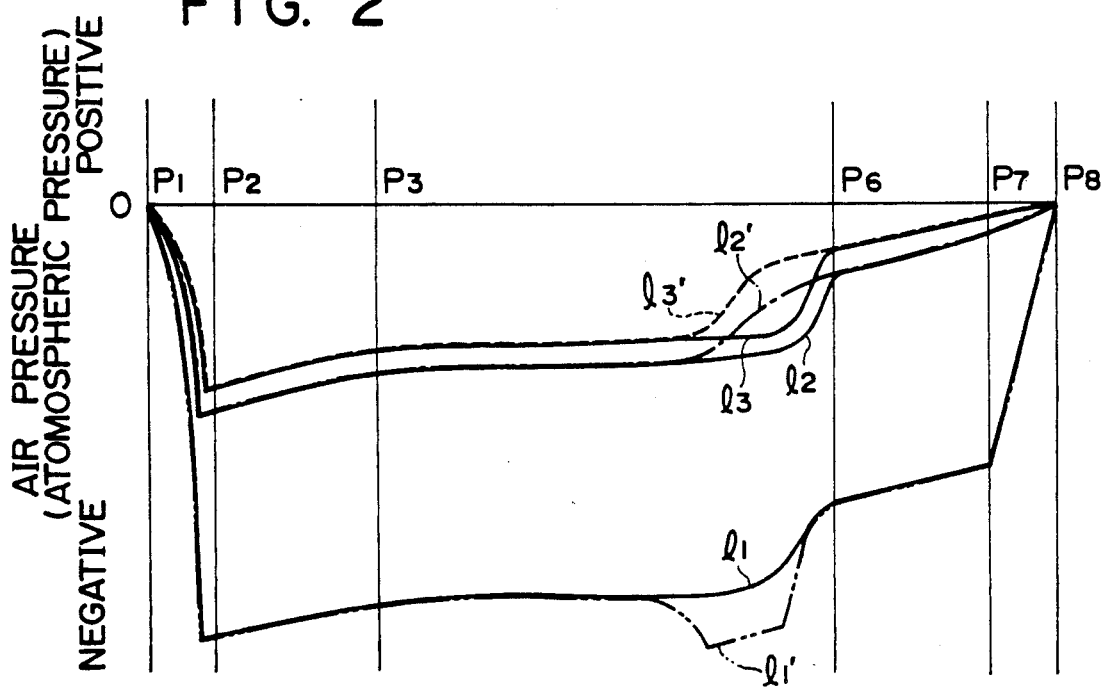
FIG. 2 is a graph showing a pressure distribution obtained when the stabilizing device shown in FIGS. 1A and 1B is used.

Study of fluidic dynamic simulation shows the distribution of air between the contact stabilizing device 3A and a recording medium 1 as shown in FIG. 2 In the FIG. 2, characteristic curves $l_1$, $l_2$ and $l_3$ are obtained when the depth of the notch 17 is 10 $\mu$m, 30 $\mu$m and 50 $\mu$m respectively. As is apparent from FIG. 2, the air pressure between the recording medium 1 and the entire surface of the stabilizing device opposite the recording medium 1 is negative when the notch 17 is provided. As is apparent from the characteristic lines $l_1$ to $l_3$, the level of negative pressure is changed while the profile of the pressure distribution remains substantially similar even when the depth of the notch 17 is changed.

The profile of the pressure distribution comprises a line which abruptly falls from 0 level (atmospheric pressure) to a negative pressure between points $P_1$ and $P_2$, a line which is maintained at a substatially constant negative pressure level between points $P_2$ to $P_6$, and a positive inclined line to 0 level between points $p_6$ to $P_8$.

A notch 16 may be formed on the protruding surface 12 of the first block member 10a at a part of a region downstream with respect to the motion of the recording medium as shown by a two dot chain line in FIGS. 1A and 1B in addition to notch 17. If the notch 16 is provided, the pressure distribution in the vicinity of the notch 16 is represented by characteristic lines $1_1'$, $1_2'$ and $1_3'$ when the depth of the notch 16 is 10 μm, 30 μm and 50 μm, i.e., the same as that of the notch 15, respectively.

The air pressure which has been positive between points $P_6$ and $P_8$ in the conventional contact stabilizing device 3 is always made negative over a entire range between points $P_1$ and $P_8$ including a range between points $P_6$ and $P_8$ by merely forming the notch 17. It is considered that this is due to a result that increase in pressure downstream is prevented since the air stream in the groove 13 downstream is released or purged to the outside of the contact stabilizing device 3A through the notch 17. The inner notch 16 need not be provided so far as we see the characteristic lines in FIG. 2. Since it is necessary to form a recess in which a magnetic head 2 is adapted on the protruding surface 12, it is desirable to form the recess in such a manner that it is continuous to the notches 17 and 16 (refer to FIGS. 3 and 4) in term of fabrication procedure.

Figure 3:
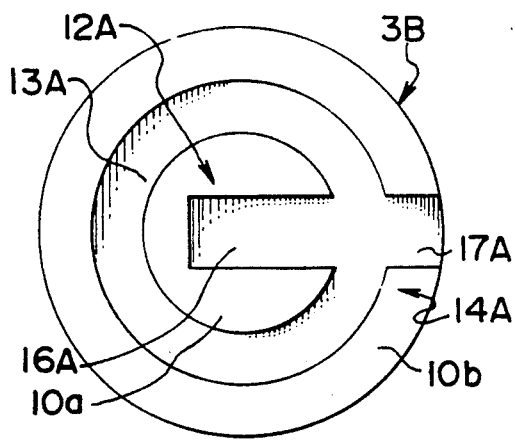
FIGS. 3 and 4 are plan views showing a medium opposing surface of the contact stabilizing devices of second and third embodiments of the present invention respectively.
Figure 4:
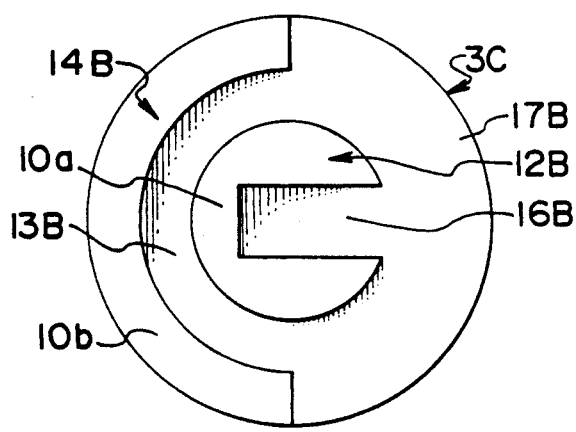

The profiles of the second and third embodiments of the contact stabilizing device of the present invention are shown in FIGS. 3 and 4 respectively.

Figure 6:
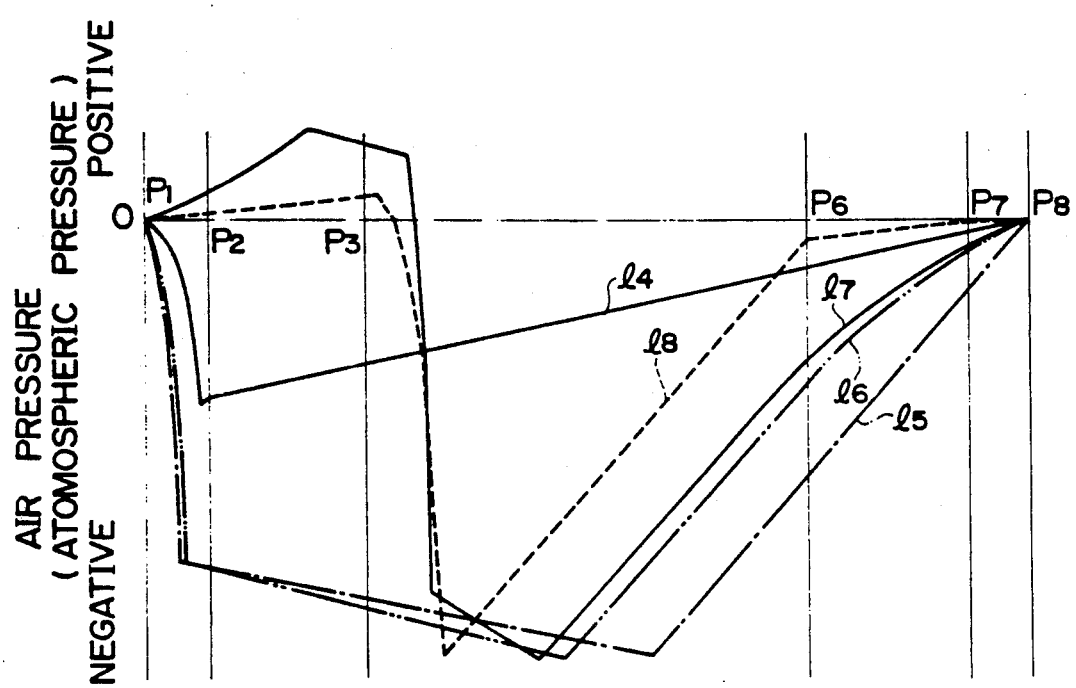
FIG. 6 is a graph showing respective pressure distributions obtained when the stabilizing devices shown in FIGS. 3 to 5 are used.

A contact stabilizing devices 3B of the second embodiment shown in FIG. 3 is provided with a notch 16A which is formed by extending the notch 16 in device 3A in the upstream direction. That is, the notch 16A extends in a radial direction from an upstream point to a downstream point on the protruding surface 12A, or medium contact sliding surface of the first block member 10a of the stabilizing device 3B coincides with a position of a notch 17A corresponding to the notch 17, formed on the medium contact sliding surface 14A of the second block 10b member beyond the groove 13A. When the notches 17A, 16A and the groove 13A are 50 μm in depth, the pressure distribution of the air between the stabilizing device 3B and the recording medium 1 is represented by a characteristic line $1_4$ in FIG. 6. If the notches 17A and 16A and the groove 13A are 20 μm in depth, the air pressure distribution is represented by a characteristic line 5.

Figure 5:
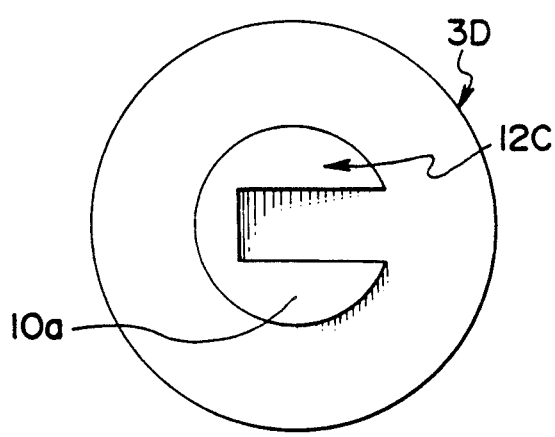
FIG. 5 is a plan view showing a medium opposing surface of the contact stabilizing device for comparison.

A contact stabilizing device 3c of a third embodiment shown in FIG. 4 includes a notch 17B which is formed by enlarging the notch 17A in the device 3B. That is, a medium sliding contact surface 14B of a second block member 10b outside of a groove 13B is formed in a semi-annular form only upstream so that a notch 17B is formed by removing the second block member 10b downstream. The notch 17B is coplanar with the groove 13B. The notch 16B on the medium sliding contact surface 12B is identical with the notch 16A of FIG. 3. When the notches 17B and 16B, and the groove 13B are 20 μm in depth in the stabilizing device 3C, a pressure distribution between the stabilizing device 3C and the recording medium 1 is represented by a characteristic line $1_6$. If a contact stabilizing device 3D having a profile as shown in FIG. 5 is formed by removing the medium sliding contact surface 14B of the protruding second block member 10b in the stabilizing device 3C, the pressure distribution between the recording medium 1 and the stabilizing device 3D is represented by characteristic lines $1_7$ and $1_8$ in FIG. 6. This shows that a positive pressure is formed upstream. The characteristic lines $1_7$ and $1_8$ are obtained when the height of the medium sliding contact surface 12c of the first block member 10a (that is, the depth of the portion other than the first block 10a) is 20 μm and 50 μm respectively.

As is apparent from the above description, it is necessary to provide the second block 10b with a notch downstream to reduce a positive pressure for forming a negative pressure. If the medium sliding contact surface at the upstream side is entirely removed the pressure would be increased to form a static pressure upstream. Accordingly, it is impossible to to entirely remove the medium sliding contact surface upstream side.

Figure 7:
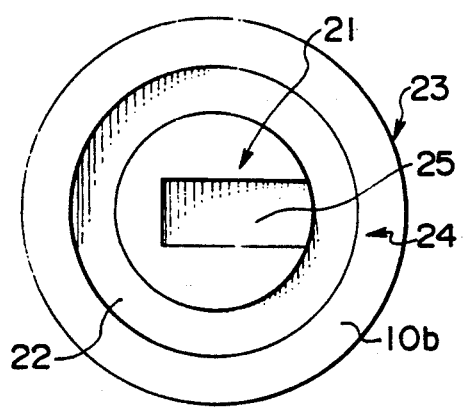
FIGS. 7 and 8 are plan views showing the medium opposing surface of respective contact stabilizing devices for reference.
Figure 8:
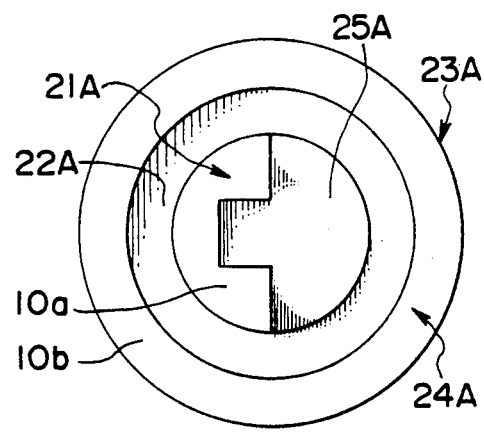

Stabilizing devices 23 and 23A having notches of various shapes formed therein, without forming any notch on the medium sliding contact surface of the second block member 10b are shown in FIGS. 7 and 8 for the reference.

The contact stabilizing device 23 shown in FIG. 7 corresponds to the stabilizing device 3B having no notch 17A shown in FIG. 3. When the depth of a groove 22 inside of the medium sliding contact surface 24 of the second block member 10b is 50 μm and the depth of a notch 25 of the medium sliding contact surface 21 of the first block member 10a is 20 μm in the stabilizing device 23, the pressure distribution between the recording medium 1 and the stabilizing device 23 is represented by a characteristic line $1_9$. When the depth of both the groove 22 and the notch 25 is 50 μm and 20 μm, the pressure distribution is represented by the characteristic line $1_{10}$ and $1_{11}$ respectively.

A stabilizing device 23A shown in FIG. 8 is similar to the stabilizing device 23 excepting that a notch 25A is enlarged in the downstream area. When the depth of a groove 22A inside of the medium sliding contact surface 24A of the second block member 10b is 50 μm and the depth of the enlarged notch 25A in the medium sliding contact surface 21A of the first block member 10a is °μm in the device 23A the pressure distribution between the recording medium 1 and the device 23A is represented by a characteristic line $1_{12}$ in FIG. 9. When the depth of both the groove 22A and the notch 25A is 20 μm, the pressure distribution is represented by a characteristic line $1_{13}$.

Figure 9:
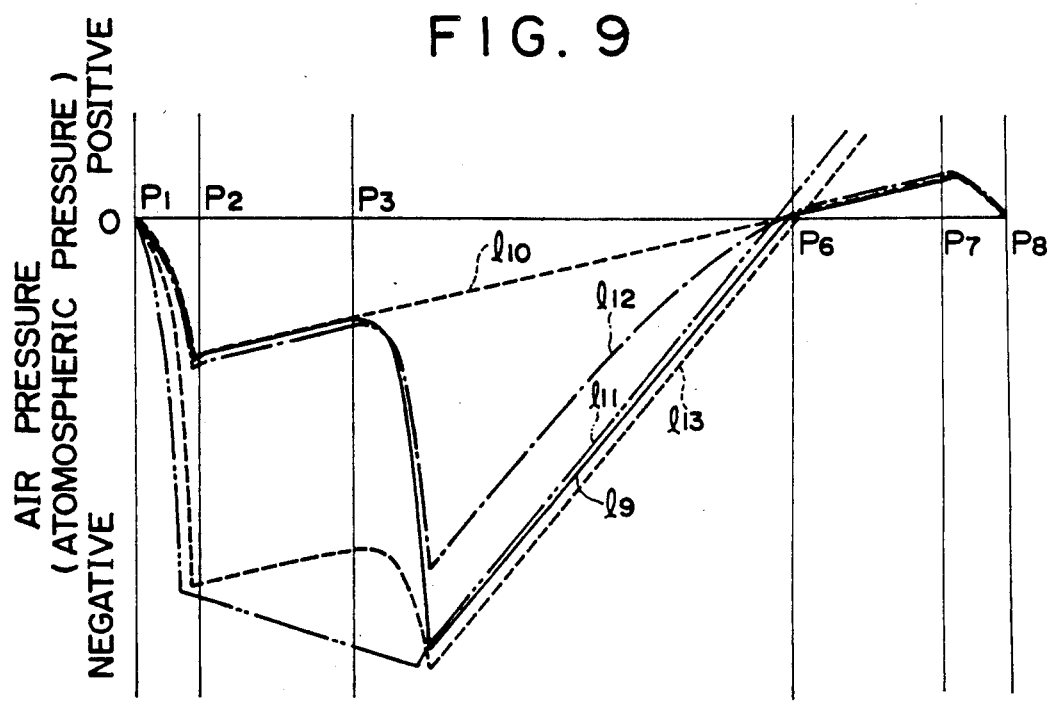
FIG. 9 is a graph showing respective pressure distributions obtained when the stabilizing devices shown in FIGS. 7 and 8 are used.

As is apparent from FIG. 9, each of characteristic lines $1_9$ to $1_{13}$ shows that the pressure at the downstream side (points $P_6$ to $P_8$) is positive. Accordingly, it is appreciated that there is no effect to decrease a static pressure at the side of downstream for forming a negative static pressure unless a notch is provided downstream of the medium sliding contact surfaces 24, 24A of the second block member 10b as in the contact stabilizing devices 23, 23A even if a notch having any shape is formed on the medium sliding contact surfaces 21, 21A of the first block member 10a.

The contact stabilizing device of the present invention is not limited to the profiles in the above-mentioned embodiments shown in FIGS. 1A, 1B, 3 and 4, but may have other various profiles. For example, the central medium sliding contact surface of the first block member 10a at the center, the groove and the medium sliding contact surface of the second block outside of the groove are formed in a concentrical manner in the above embodiments. They need not always be circular or annular, but may be formed into other profiles including an ellipse or a rectlinear part.

Figure 10A:
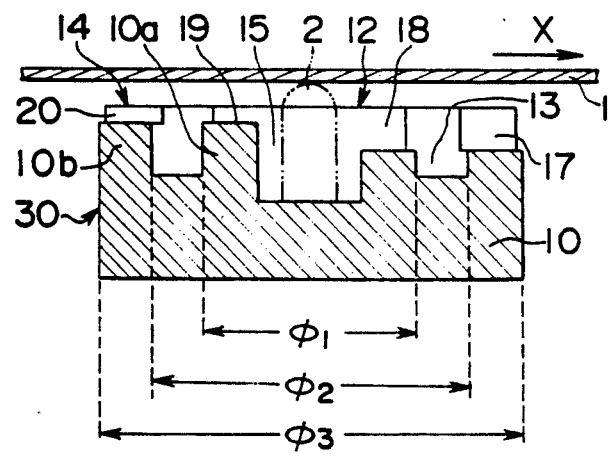
FIGS. 10A and 10B are a longitudinal cross-sectional view showing a contact stabilizing device of a fourth embodiment of the present invention and a plan view of the medium opposing surface of the device respectively.
Figure 10B:
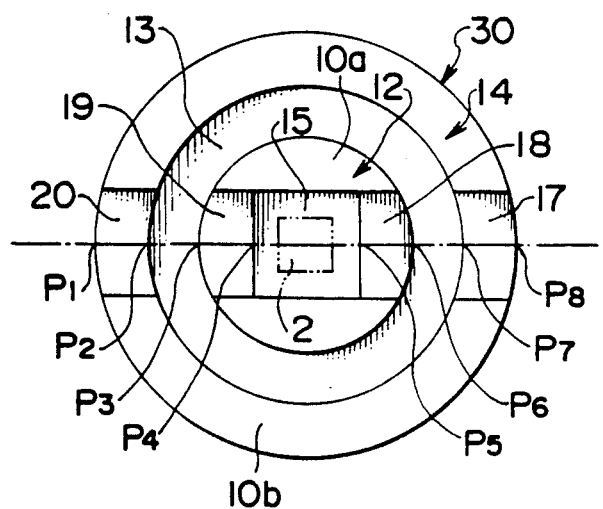

A contact stabilizing device of a fourth embodiment of the present invention will be described with reference to FIGS. 10A and 10B. The stabilizing device 30 is substantially identical with the contact stabilizing device 3A in profile and dimension, but is differenct from the device 3A in that notches 20 and 17 having a width substantially same as that of a head adapted hole 15 are formed on the medium sliding contact surface 14 of the second block member 10b upstream and downstream respectively. Similarly, notches 19 and 18 having a width the same as that of the head embedded hole 15 are formed on the medium sliding contact surface 12 of the first block member 10a at the upstream and downstream sides as viewed from the hole 15 to which a magnetic head is adapted. A groove 13 is formed between the first and second block members 10a and 10b respectively as viewed from the hole 15 to which a magnetic head is adapted. Upstream notches 20 and 19 are shallow in depth while downstream notches 18 and 17 are deep in depth. The notches 19 and 20 make it easy to introduce air into the groove 13 and the notches 18, 17.

Figure 11:
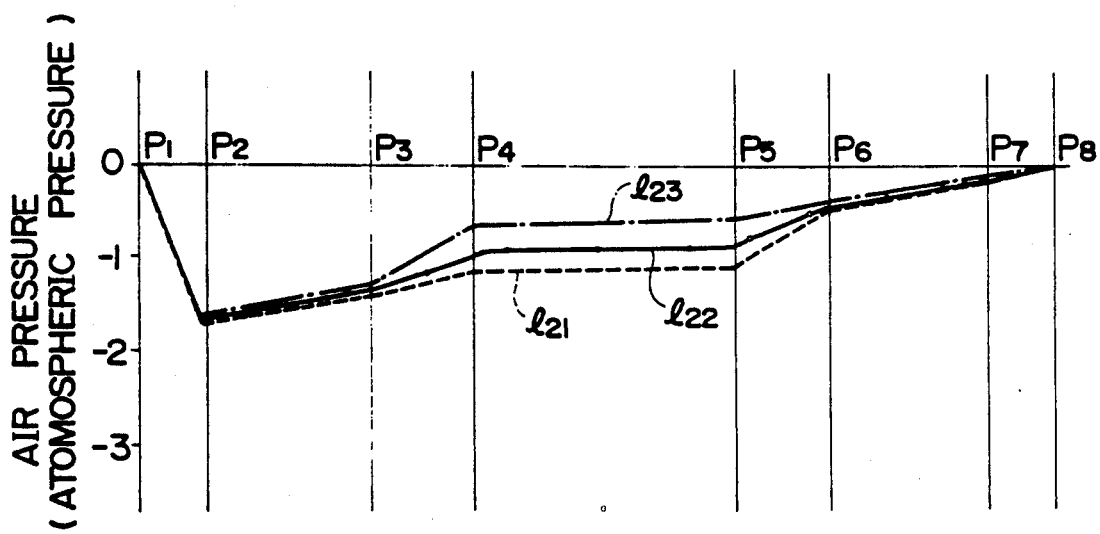
FIG. 11 is a graph showing the pressure distributions obtained when the stabilizing devices shown in FIGS. 10A and 10B are used.

Similar to the afore-mentioned embodiment, third dynamic simulation shows a pressure distribution shown in FIG. 11 when the atmospheric pressure between the stabilizing device 30 and the recording medium 1 is 0 level. In FIG. 11, a characteristic line $l_{21}$ is obtained when the depth of the notches 19, 20 and 17, 18 is $10\mu$ and $20$ $\mu$m respectively. A characteristic line $l_{22}$ is obtained when the depth of the notches 19, 20 and 17, 18 is 10 $\mu$m and 30 $\mu$m respectively. A characteristic line $l_{23}$ is obtained when the depth of the notches 19, 20 and 17, 18 is 10 $\mu$m and 50 $\mu$m respectively.

As is apparent from FIG. 11, the air pressure between the recording medium and the entire surface of the stabilizing divice 30 opposite the recording medium is negative when notches 19, 20 and 17, 18 are provided. Even if the depth of the downstream notches 17, 18 is changed, the level at points $P_3$-$P_6$ is only slightly changed in an uniform manner. A negative pressure is also formed over an entire surface of the stabilizing device 30 opposite the recording medium 1. The profile of the pressure distribution includes a line which abruptly falls from 0 level (atmospheric pressure) to a negative pressure between points $P_1$ and $P_2$, a line maintained at a substantially constant negative level between points $P_2$ and $P_6$, and a line which increases to 0 level between points $P_6$ and $P_8$. Study of the pressure distribution when the depth of the upstream notches 20, 19 is 20 $\mu$m and the depth of the downstream notches 18, 19 is 50 $\mu$m, that is, the depth of the upstream notches 20, 19 of the stabilizing device which provide the characteristic line $l_{23}$ is made deeper, shows that the level of the negative static pressure is lowered although the profile of the pressure distribution is substantially identical with that of the characteristic line $l_{23}$.

Figure 19:
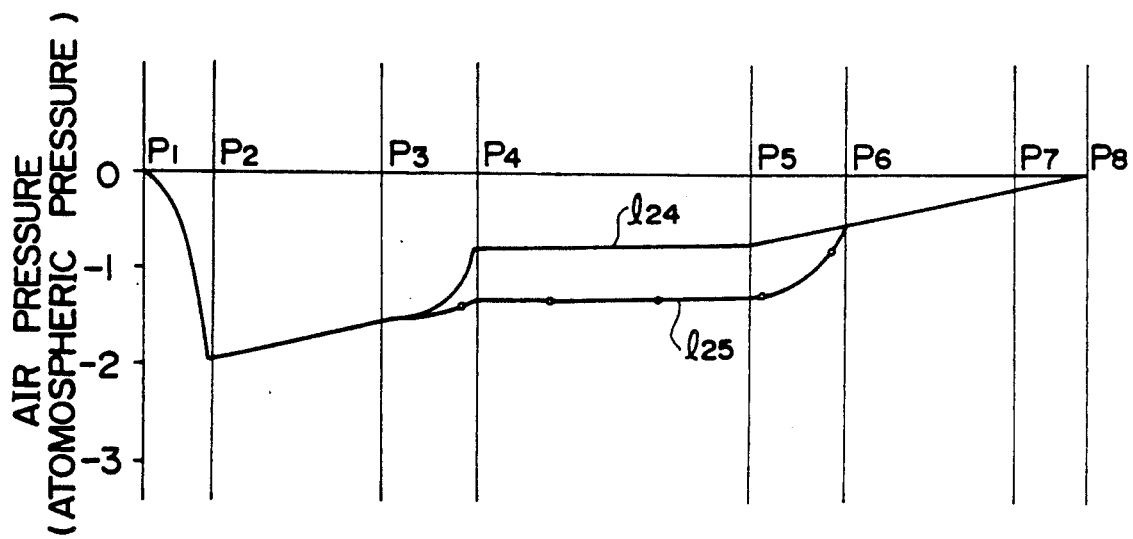
FIG. 19 is a graph showing pressure distributions obtained when the contact stabilizing devices shown in FIGS. 17A, 17B and 18A, 18B are used.

In such a manner, the relative pressure over an entire region between points $P_1$ and $P_8$ including a region between points $P_6$ and $P_8$ is made negative by forming notches 17 to 20 similar to the stabilizing device 30 while the relative pressure at a region between points $P_6$ and $P_8$ was positive in a conventional stabilizing device. It is considered that this is due to the result that the increase in pressure in this downstream region is prevented since the air stream downstream of the groove 13 is purged to the outside of the stabilizing device 30 through the notch 17 similar to the first embodiment. This is apparent from FIG. 19 showing the result of simulation of stabilizing devices 30A and 30B shown in FIGS. 17A, 17B and 18A, 18B respectively which are constructed similar to the first embodiment shown in FIGS. 1A and 1B for comparison.

The stabilizing device 30A (FIGS. 17A, 17B) is different from the stabilizing device 30 of the above-mentioned embodiment in that it is not provided with upstream notches 19 and 20. The stabilizing device 30B (FIGS. 18A, 18B) is different from the stabilizing device 30 in that it is not provided with upstream notches 19 and 20 and a downstream notch 18b on the second block member 10b. That is, the stabilizing device 30A is provided with a notch 18 on the first block member 10a and a notch 17 on the second block member 10b downstream side. The stabilizing device 30B is provided with only a notch 17 on the second block member 10b downstream side. Characteristic lines $l_{24}$ and $l_{25}$ in FIG. 19 show the pressure distribution in the stabilizing devices 30A and 30B respectively. In simulation, the depth of both the notches 18 and 17 of the stabilizing device 30A and the depth of the notch 17 of the stabilizing device 30B is 50 $\mu$m. As is apparent from the characteristic lines $l_{24}$ and $l_{25}$, it is understood that the pressure is negative over an entire region between points $P_1$ and $P_8$ although the profile of the pressure distribution of these stabilizing devices 30A and 30B is slightly different from that of the stabilizing device 30 (FIG. 11).

Accordingly it is understood that the increase in pressure between points $P_6$ and $P_8$ can be prevented by merely providing the notch 17 on the second block member 10b downstream, resulting in no formation of positive relative pressure.

The foregoing description applies to a case where the medium sliding contact surface of the stabilizing device is disposed in a parallel relationship with the recording medium 1 to maintain uniform space therebetween. In practice, it is difficult to maintain a perfiectly parallel relationship between the stabilizing device and the recording medium due to distortion of the recording medium 1 per se, and misalignment of the stabilizing device.

Figure 22:
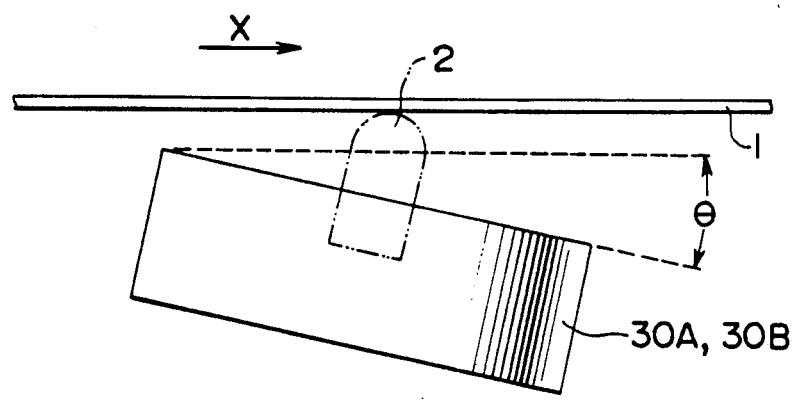
FIG. 22 is an elevational view showing a contact stabilizing device which is inclined with respect to a recording medium.
Figure 23:
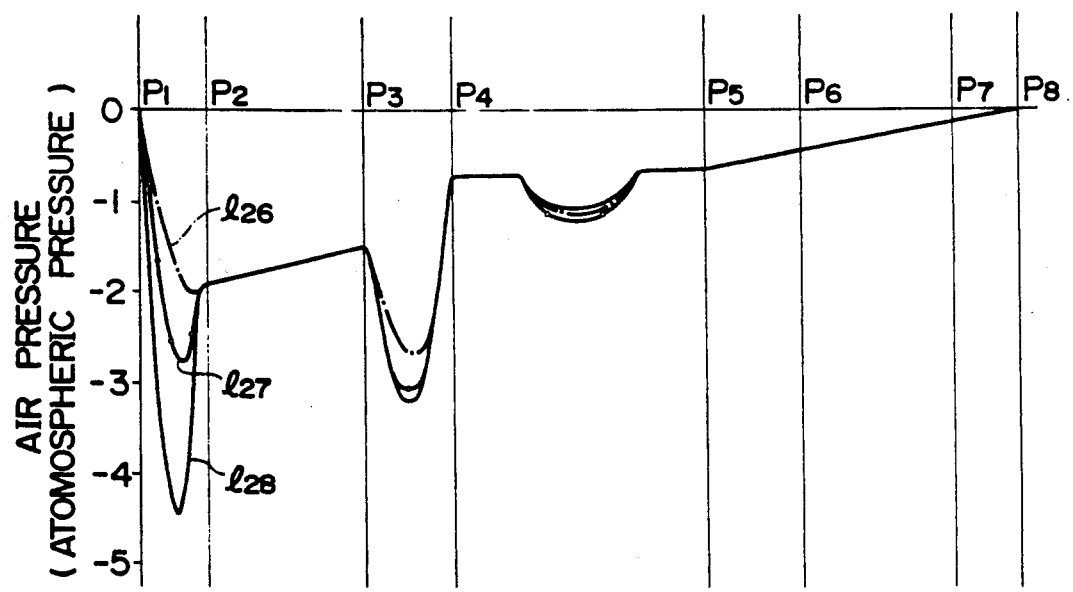
FIG. 23 is a graph showing a pressure distribution when the stabilizing device shown in FIGS. 17A and 17B is slightly inclined with respect to a recording medium.
Figure 24:
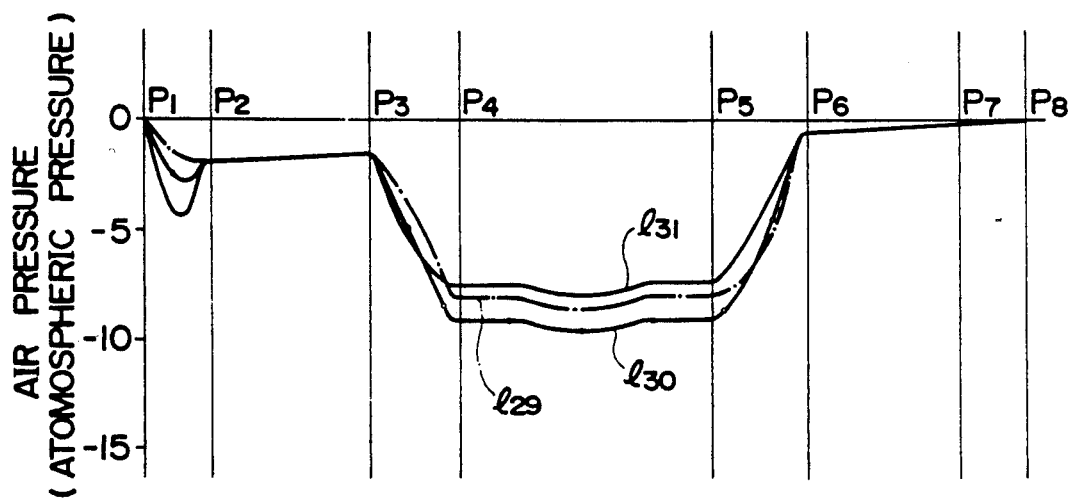
FIG. 24 is a graph showing a pressure distribution obtained when the stabilizing device shown in FIGS. 18A and 18B is slightly inclined with respect to a recording medium.

FIGS. 23 and 24 show the result of study of a case wherein each of the stabilizing devices 30A, 30B is disposed with respect to the medium in such a manner that the medium sliding contact surface is inclined to the horizontally disposed recording and/or playback surface of the medium at an angle $\theta$ at the side of downstream with respect to motion direction of the medium 1 as is shown in FIG. 22.

As is apparent from FIGS. 23 and 24, providing a remarkably large inclination angle $\theta$ of the medium sliding contact surface of the stabilizing device 30A, 30B makes a spacing between the medium and the sliding contact surface exessively large and cancels the variation in pressure due to atmospheric pressure while the negative pressure largely changes when the inclination angle $\theta$ is very small. Characteristic lines $l_{26}$, $l_{27}$ and $l_{28}$ in FIG. 23 are obtained when the inclination angle $\theta$ of the stabilization device 30A is 0.005°, 0.01° and 0.02° respectively. Characteristic lines $l_{29}$, $l_{30}$ and $l_{31}$ of FIG. 24 are obtained when the inclination angle $\theta$ of the stabilizing device 30B is 0.005°, 0.01° and 0.02° respectively. It is understood from the comparison of these characteristic lines $1_{26}$ to $1_{31}$ against the lines $1_{24}$ and $1_{25}$ in FIG. 19 that slight inclination of the medium sliding contact surface with respect to the medium causes very large negative pressure in both stabilizing devices 30A and 30B. It is considered that this is due to the fact that inclination of the medium sliding contact surface causes the downstream notches 18 and 17 to move away from the recording medium 1 to enhance the function of an air stream purging path. The range of variation of negative pressure is lower in the stabilizing device 30A having the notch 18 at the first block member 10a than in the stabilizing device 30B. When an experiment of recording and reproducing using the stabilizing devices 30A and 30B is conducted, the stabilizing device sometimes abnormally sticks to the recording medium 1, resulting in difficult motion of the recording medium 1. It is considered that the results of the afore-mentioned simulation support the facts of this experiment.

Figure 12:
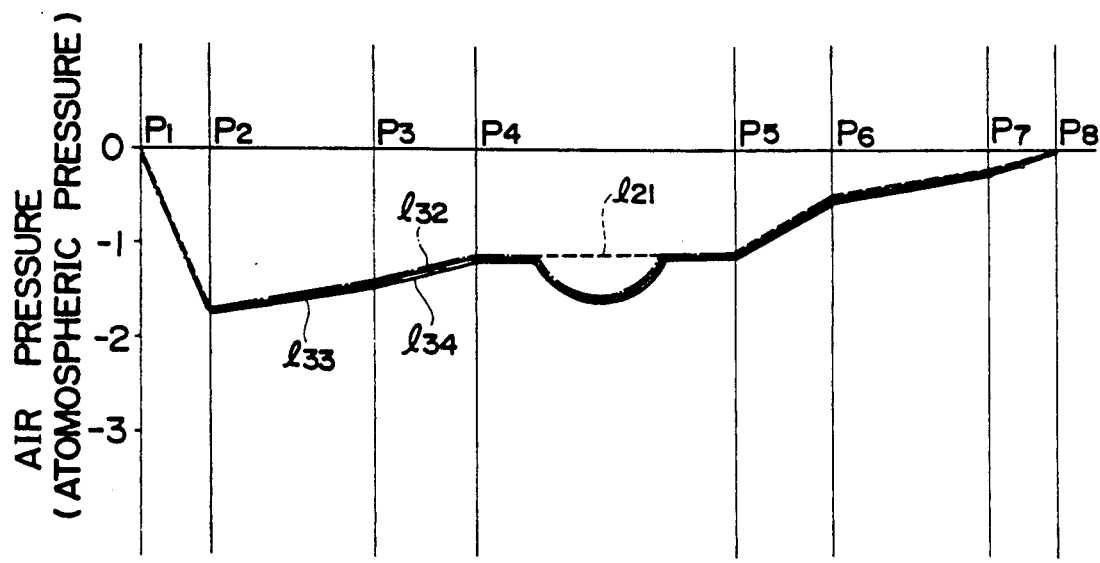
FIG. 12 is a graph showing pressure distributions when the stabilizing devices shown in FIGS. 10A and 10B are slightly inclined with respect to the recording medium.

A case where the stabilizing device 30 of the present embodiment is similarly inclined will be described. Characteristic lines $1_{32}$, $1_{33}$ and $1_{34}$ shown in FIG. 12 are obtained when the stabilizing device 30 is slightly inclined to the recording medium at an angle $\theta$, 0.005°, 0.01° and 0.02° respectively similarly to the stabilizing devices 30A and 30B shown in FIG. 22. Comparison of these characteristic lines $1_{32}$, $1_{33}$ and $1_{34}$ with the characteristic line $1_{21}$ obtained when the stabilizing device 30 is not inclined shows that small variation of negative pressure is found even when the stabilizing device 30 is inclined. Of course, a negative pressure is formed over an entire region between points P1 and P8. Accoridngly it is considered that elevation of relative pressure can be prevented since the notches 20 and 19 effectively function as air stream purge path by provision of upstream notches 16 and 17 even when the stabilizing device 30 is inclined.

Figure 13:
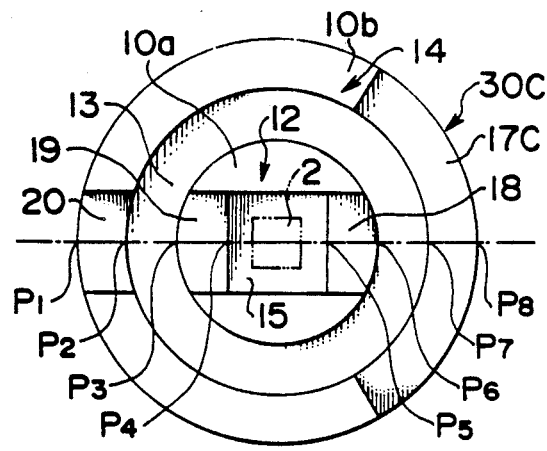
FIGS. 13, 14 and 15 are plan views showing the medium opposing surfaces of contact stabilizing devices of 5th, 6th and 7th embodiments of the present invention respectively.
Figure 14:
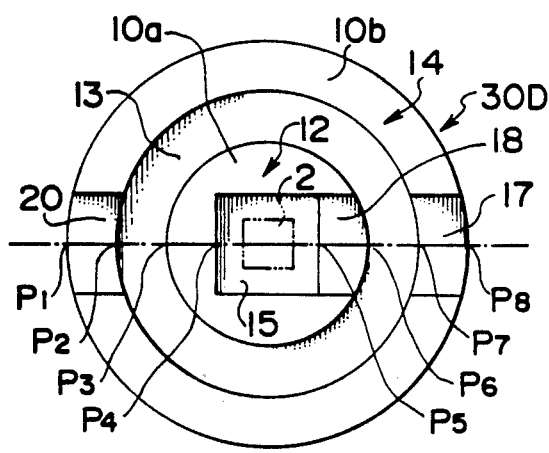
Figure 15:
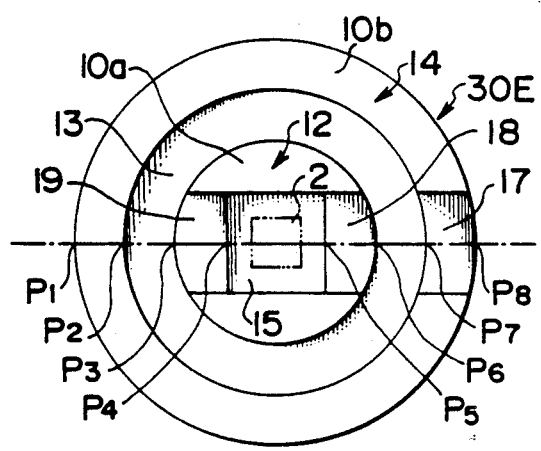

The structures of fifth, sixth and seventh embodiments of the stabilizing device of the present invention are shown in FIGS. 13 to 15 respectively.

A stabilizing device 30C of the fifth embodiment in FIG. 13 is formed with a notch 17C which is an enlarged downstream notch 17 of the second block member 10b in the stabilizing device 30. There is shown a characteristic line $1_{35}$ in FIG. 16 which is obtained when the depth of upstream notches 19 and 20 is 10 μm and the depth of downstream notches 18, 17C is 30 μm.

Figure 16:
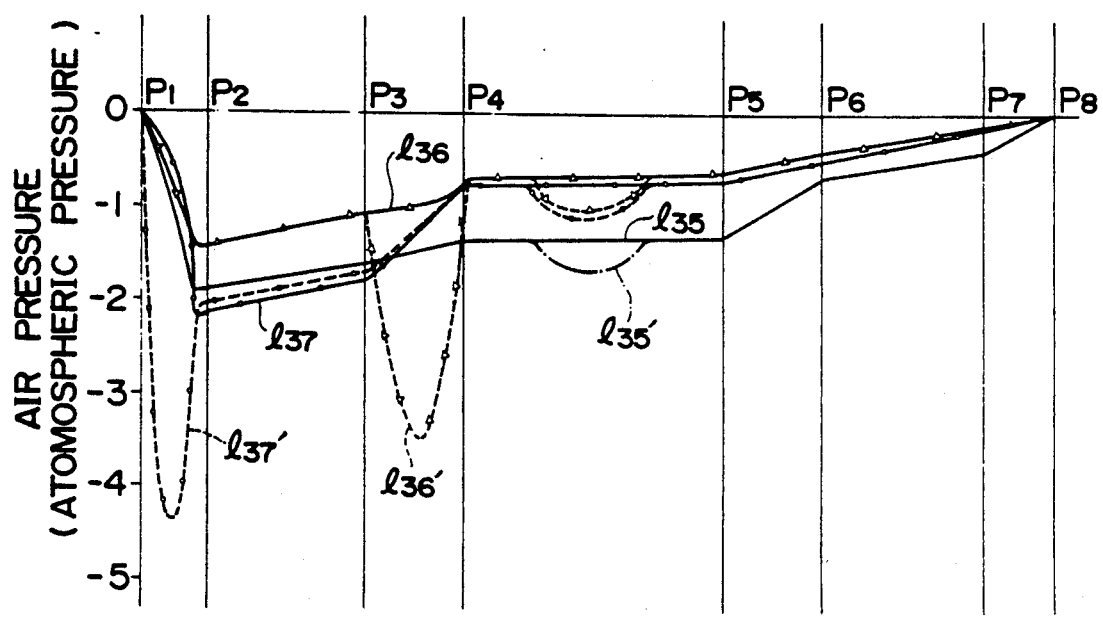
FIG. 16 is a graph showing pressure distributions obtained when the stabilizing devices shown in FIGS. 13 to 15 are used.
Figure 17A:
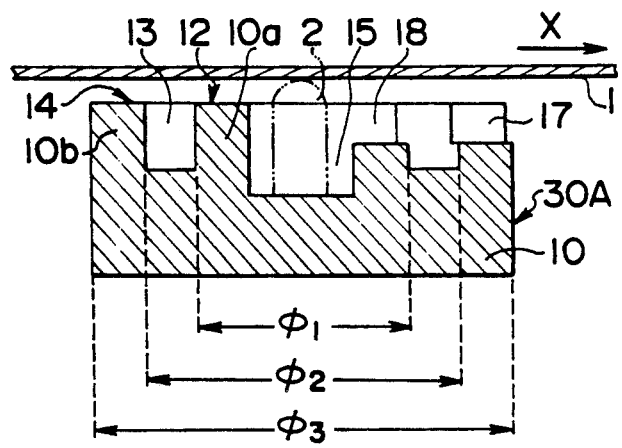
FIGS. 17A and 17B, 18A and 18B are cross-sectional views showing contact stabilizing devices and plan views of medium opposing surface of the device respectively.
Figure 17B:
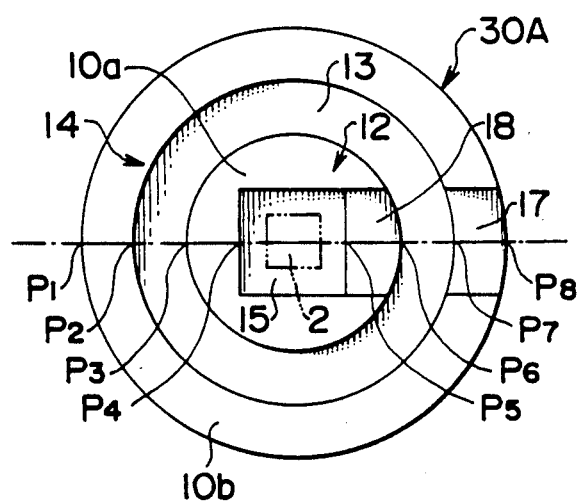
Figure 18A:
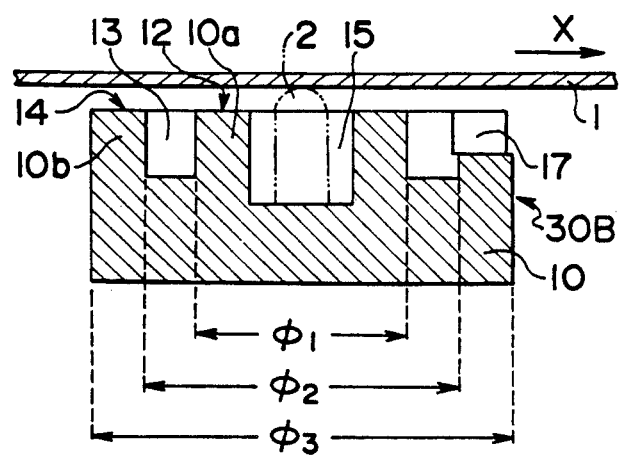
Figure 18B:
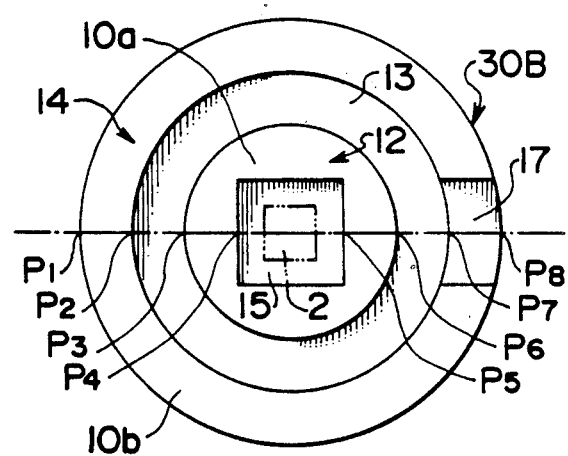

A stabilizing device 30D of the sixth embodiment shown in FIG. 14 and a stabilizing device 30E of the seventh embodiment shown in FIG. 16 are provided with only one of the upstream notches 19 and 20 in the stabilizing device 30. The stabilizing device 30D has only the notch 20 upstream. The stabilizing device 30E has only the upstream notch 19. The pressure distribution in the stabilizing devices 30D and 30E are shown by characteristic lines $1_{36}$ and $1_{37}$ in FIG. 16 respectively. As is apparent from these characteristic lines $1_{35}$ to $1_{37}$, a negative pressure is formed over an entire region between points P1 and P8 and the profile of the pressure distribution is relatively flat in all stabilizing devices 30C, 30D and 30E. The results when the inclination angle $\theta$ of the stabilizing devices 30C, 30D and 30E is 0.02° are shown by characteristic lines $1_{35}'$, $1_{36}'$ and $1_{37}'$ in FIG. 16 respectively. When the stabilizing device is inclined with respect to the recording medium 1, in the stabilizing devices 30D and 30E, variation in negative pressure locally takes place at a region where no upstream notch is provided while variation in negative pressure is suppressed at a region where a notch is provided. The pressure distribution of these devices 30D and 30E is improved in comparison to the stabilizing devices 30A and 30B. The negative pressure does not nearly change in the stabilizing device 30C even if it is inclined.

In such a manner, in the stabilizing device of the fifth through seventh embodiments a negative pressure is obtained over an entire region and the profile of the negative pressure distribtuion does not largely change even when the stabilizing device is inclined with respect to the recording medium 1 due to the fact that the stabilizing device has a notch on at least second block member 10b downstream with respect to the head 2 and has a notch on the first and/or second block member upstream.

The stabilizing device of the present invention is not limited to the profiles shown in FIGS. 10A, 10B and 13 to 15. The width and depth of the notches 17 to 20 may be changed. The medium sliding contact surface of the first block member need not be concentric with the groove, and the medium sliding contact surface of the second block. The stabilizing device may be in the profile including an ellipse and rectilinear portion.

Figure 20A:
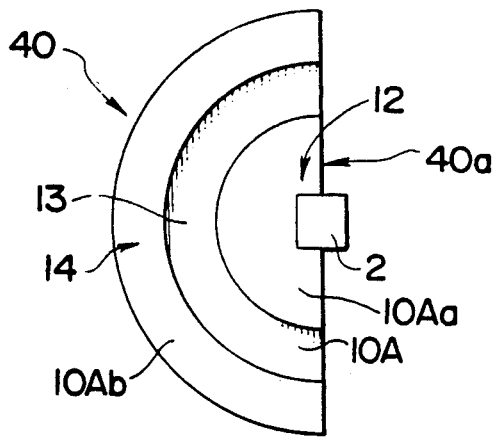
FIGS. 20A and 20B are plan view and cross-sectional view showing a contact stabilizing device of an 8th embodiment of the present invention respectively.
Figure 20B:
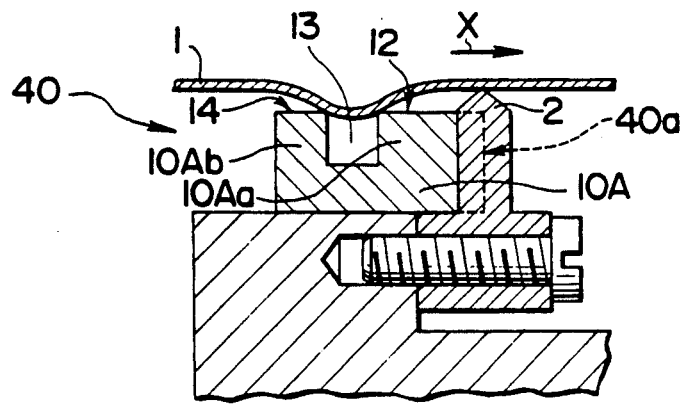

A contact stabilizing device 40 of an eighth embodiment is shown in FIGS. 20A and 20B. The stabilizing device 40 comprises a small column like base block member 10A having a semicircular cross-section, semicircular first and second block members 10Aa and 10Ab on the base block 10A which are integral therewith, and a magnetic head 2 at the center of a terminating face 40a for saving the material and ease of fabrication and maintainance while the afore-mentioned stabilizing device comprises first and second blocks members 10a and 10b which are concentrically disposed on a small column like base block member 10 and protrude therefrom so that coacting of the block members with a groove 13 forms a negative pressure for sucking a recording medium. That is, the stabilizing device 40 comprises only an upstream half of the stabilizing device 3A of the first embodiment of the present invention shown in FIGS. 1A and 1B. The stabilizing device 40 of the eighth embodiment is equivalent to the stabilizing device 3C of the third embodiment of the present invention shown in FIG. 4 in which a downstream half of the device is omitted.

A sufficient negative pressure for sucking a medium can be formed and a positive pressure which is formed at the rear half of the device can be eliminated although the device is formed in such a manner. The device can be made of only half the amount of the material of previous embodiments and is easily fabricated since the rear half of the device opens. Maintainance of the stabilizing device is easy since it is easy to mount or remove the magnetic head 2.

Figure 21:
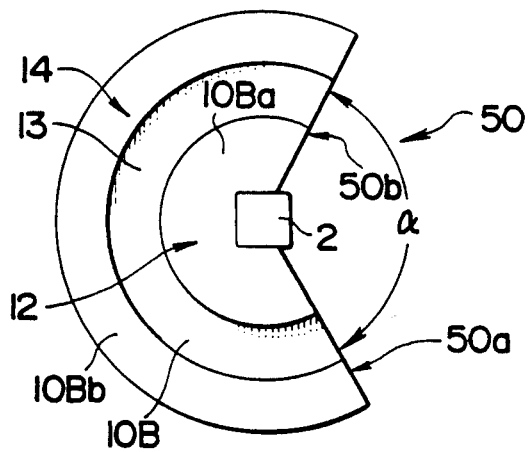
FIG. 21 is a top plan view showing a contact stabilizing device of a 9th embodiment of the present invention.

The rear half positive pressure eliminating means may alternatively be formed as a sector notch 50a at the downstream rear half as is provided in the stabilizing device 50 of the ninth embodiment of the present invention shown in FIG. 21. That is, the stabilizing device 50 comprises first and second block members 10Ba and 10Bb which are concentrically formed on the upper surface of a base block member 10B having a notch 50a which is formed by removing a sector like downstream portion. A magnetic head 2 is removably disposed at the center of a terminating face 50b which is taken away into a sector form.

The same operation and effect as that of the stabilizing device 40 of the eighth embodiment can be obtained although the stabilizing device is formed in such a manner. An angle α of a sector which is removed is optional.

A contact stabilizing device of a tenth embodiment of the present invention in which stable contact with a recording medium is assured in order to accomplish other purposes of the present invention even when the rotational speed of the recording medium is different between recording/reproducing and erasing, will now be described.

Figure 25:
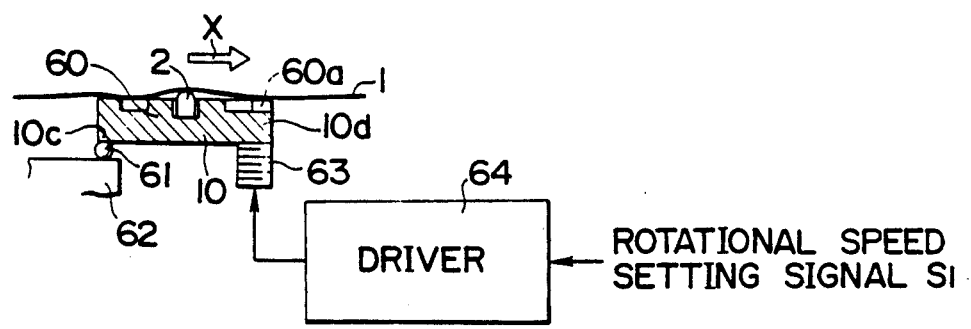
FIG. 25 is an elevational view showing a main part of a contact stabilizing device of a 10th embodiment of the present invention.
Figure 28:
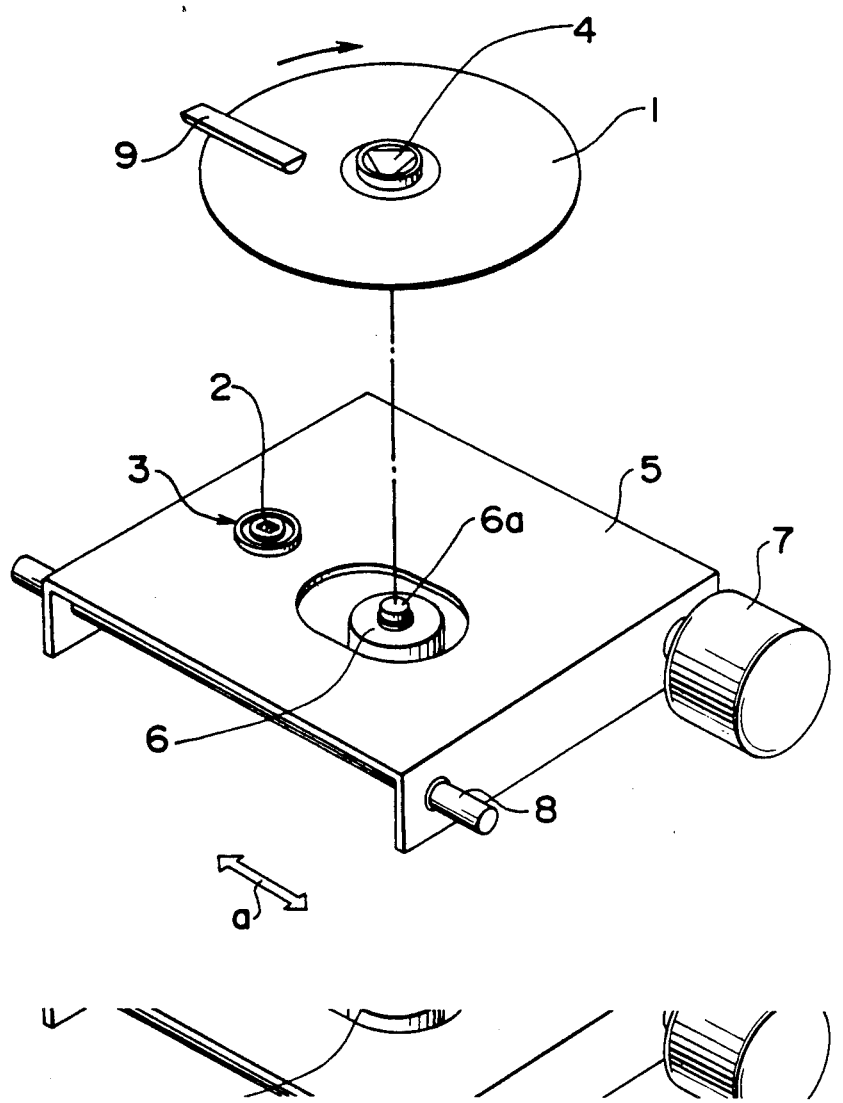
FIG. 28 is an exploded perspective view showing an example of a conventional recording medium regulating device.

As shown in FIG. 25, a stabilizing device 60 of a tenth embodiment comprises a magnetic head 2 the center thereof which serves as a transducer and a sucking ring in which a notch 60a is provided downstream. Assuming the rotational direction in which the recording medium 1 is rotated in a sliding contact relationship with the stabilizing device 60 be a direction shown by an arrow X, the stabilizing device 60 is supported in a cantilever manner at the upstream lower end 10C thereof by a spherical bearing 61 on the device supporting member 62 secured on a head carriage 5 (refer to FIG. 28). A piezoelectric element 63 which serves as an actuator means is secured to the downstream lower end 10d of the device 60.

A rotational speed setting signal $S_1$ representative of a relative rotational speed between the recording medium 1 and the head 2 is applied to the piezoelectric element 63 through a driver 64 comprising an operational amplifier, etc. The rotational speed setting signal may be a binary signal such as H or L levels, or other linear signal for adjusting.

In this embodiment thus formed, the rotational speed setting signal $S_1$ which has been amplified by the driver 64 is applied to the piezoelectric element 63. The element 63 then causes a mechanical displacement depending upon an amplitude of the applied rotational speed setting signal $S_1$ due to the well-known piezoelectric effect. When this displacement takes place the stabilizing device which is supported on the bearing 61 in a cantilever manner around the supporting member 62 is slightly moved away from the opposing recording medium 1 downstream of the medium, so that the device is inclinded with respect to the medium 1 to provide an inclination angle $\theta_1$ (between the lower face of the medium and an upper face of the device downstream in FIG. 25).

In a prior art arrangement, the formed negative pressure is reduced, resulting in that a stable head contact may not be obtained when the rotational speed of the recording medium 1 is reduced by the rotational speed setting signal $s_1$. In the present invention, substantially constant negative pressure is obtained observing it as a whole system even when the rotational speed of the recording medium, that is, a moving speed of the medium 1 is changed since the inclination angle of the stabilizing device 60 with respect to the recording medium is changed in response to the rotational speed setting signal $s_1$ as is done in the afore-mentioned embodiment.

Figure 26:
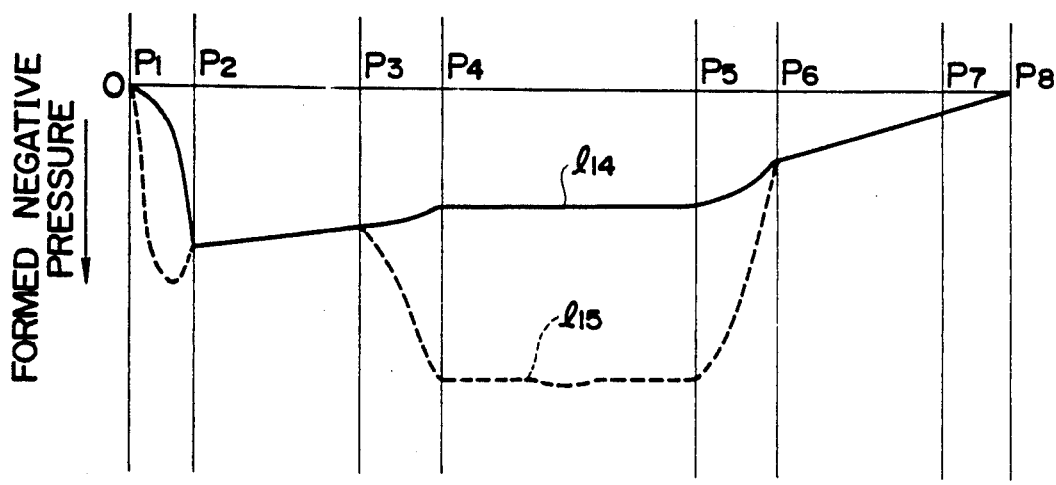
FIG. 26 is a graph showing the distribution of a negative pressure formed when the stabilizing device of the 10th embodiment is inclined.

The relation between the inclination angle and the formed negative pressure will be described. FIG. 26 shows the relation between the formed negative pressure and the position along the central cross-section of the stabilizing device 60 in motion direction of the medium. The ordinate expresses the position and the abscissa expresses the negative pressure. It is assumed that the recording medium 1 is made of rigid material, that is, the recording medium is not deformed. A solid line $1_{14}$ represents a negative pressure formed when the inclination angle is 0°, that is, the stabilizing device 60 is in a parallel relationship with the recording medium in a motion direction thereof. The dotted line $1_{15}$ represents the negative pressure formed when the inclination angle is $\theta_1$. It can be appreciated from FIG. 26 that a negative pressure formed at a position of the recording medium, corresponding to the magnetic head when there is some inclination angle, is increased several times compared to a case when there is no inclination angle. If the inclination angle is increased from 0°, the formed negative pressure would become maximum at $\theta_1 = 0.01°$. At this time, the ratio of increase in negative pressure is approximately 4 to 5 times. Accoridngly, if a proper inclination angle is selected, a proper sucking negative pressure depending upon the rotational speed of the recording medium could be obtained.

Figure 27:
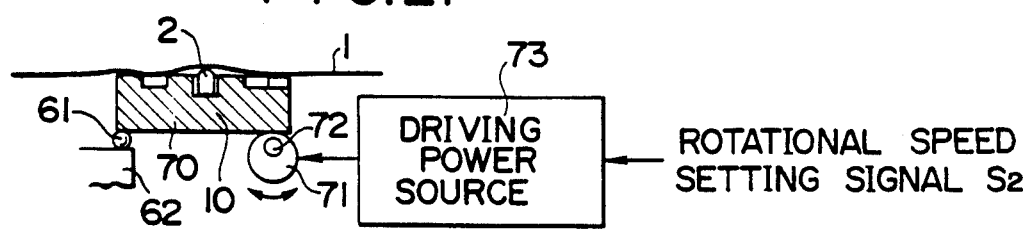
FIG. 27 is an elevational view showing a main part of a contact stabilizing device of 11th embodiment of the present invention.

FIG. 27 shows a main structure of a contact stabilizing device of an 11th embodiment of the present invention. The present embodiment is different from the 10th embodiment in that an eccentric cam 71 is used in lieu of the piezoelectric element 63 to provide an inclination angle to a stabilizing device 70.

A base block member 10 of the stabilizing device 70 is supported by a spherical bearing 61 and a stabilizing device supporting member 62 at the underside of the upstream end thereof in a cantilever manner as is similar to the 10th embodiment. However the base block 10 abuts at the underside of the downstream end thereof on the eccentric cam 71 having a rotary shaft 72 at an off-center position. The rotary shaft 72 of the eccentric cam 71 is rotated by means of a driving power source 73 comprising a motor, solenoid, etc. The driving power source 73 determines the displacement of the eccentric cam 71 in response to a rotational speed setting signal $S_2$. The stabilizing device 70 thus moves away from the recording medium 1 to set an inclination angle $\theta_1$.

In the above description, an inclination angle is provided by displacing the downstream end of the base block member 10 of the stabilizing devices 60, 70 while the underside of the upstream end of the block member is supported. It is preferable that the upstream supporting means include a stabilizing device supporting member 62 and a spherical bearing 61 thereon as is disclosed in the present embodiment since the inclination angle required to increase the negative pressure is as small as 0.01°.

However the supporting means is not limited to those in the present embodiments. It is apparent that the supporting means may be a structure which provides stable head contact by providing an inclination angle to the stabilizing device even when the rotational speed of the recording medium is changed.

What is claimed is:

1. A transducer-to-medium stabilizing device to be assembled with a transducer in a recording and/or reproducing apparatus using a flexible storage disk as an information recording medium comprising:

a base block member forming a main structure member of the device;

said base block member and said disk being linearly movable relative to one another;

a first block member formed on said base block member in the vicinity of and substantially surrounding the transducer, said first block member having a first surface opposite said flexible storage disk to cause a negative static pressure over said first surface by coacting with flexible storage disk;

a second block member which is formed on said base block member and substantially surrounding said first block member and arranged a spaced distance therefrom so that a groove is formed between said first and second block members, said second block member having a second surface opposite said flexible storage disk to cause a negative static pressure over said second surface by coacting with the flexible storage disk; and a static pressure releasing means on said stabilizing device located downstream with respect to the direction of relative motion of the flexible storage disk and extending between said groove and the outer periphery of said second block member for releasing static air pressure in said groove to the surrounding atmosphere to prevent the formation of a positive static pressure throughout a part of a region between each opposing surface of the stabilizing device and successive portion of the flexible storage disk.

2. A transducer-to-medium stabilizing device as defined in claim 1, further comprising:

inlet means on said stabilizing device located upstream with respect to the direction of relative motion of the flexible storage disk so as to prevent possible formation of an excessive negative static pressure at a region between each opposing surface of the stabilizing device and successive portions of the flexible storage disk.

3. A transducer-to-medium stabilizing device as defined in claim 1 or 2, wherein said base block member is terminated downstream thereof with respect to the direction of relative motion of the flexible storage disk in such a manner that said base block forms an end face on which the transducer may be disposed.

4. A transducer-to-medium stabilizing device as defined in claim 1 or 2 further comprising:

an adjusting means for adjusting relative attitude of the device with respect to a nominal plane of the flexible storage disk in response to a rotational speed of the flexible storage disk.

5. A transducer-to-medium stabilizing device as defined in claim 1 or 2, wherein said static pressure releasing means is formed on a part of said second block member capable of communication said groove with the atmosphere around said stabilizing device therethrough while the flexible storage disk closes an opening side of said groove.

6. A transducer-to-medium stabilizing device as defined in claim 2, wherein said inlet means is formed on a part of said second block member capable of communicating said groove with the atmosphere around the stabilizing device therethrough while the applied flexible storage disk closes an opening side of said groove.

7. A transducer-to-medium stabilizing device as defined in claim 1 wherein the transducer is embedded in the first block member at the center thereof in such a manner that it slightly projects beyond said first surface and toward the flexible storage disk.

8. A transducer-to-medium stabilizing device as defined in claim 1 wherein the first block member has substantially the shape of a circular disc.

9. A transducer-to-medium stabilizing device as defined in claim 8 wherein the second block member is annular in contour.

10. A transducer-to-medium stabilizing device as defined in claim 9 wherein the transducer, the first and second block members are coaxial with each other.

11. A transducer-to-medium stabilizing device as defined in claim 3 further comprising:

an adjusting means for adjusting the relative attitude of the device with respect to a nominal plane of the flexible storage disk in response to a rotational speed of the flexible storage disk.

12. A transducer-to-medium stabilizing device for assembly with a transducer in a recording and/or reproducing apparatus using a rotating flexible storage disk as an information recording medium, comprising:

first means for supporting said transducer;

said transducer being positioned at a central location on said first means;

said first means having first and second annular surfaces substantially surrounding said transducer;

a groove separating said first and second surfaces;

said first and second surfaces developing a negative static pressure due to coaction with said flexible storage disk when said disk is rotated;

means for moving said first means in a predetermined substantially linear direction relative to said disk to align said transducer with recording tracks on said medium;

said first means being provided with static pressure releasing means communicating said groove with the surrounding atmosphere at a location downstream relative to said direction of movement for releasing static pressure in said groove and preventing the formation of positive static pressure in the region between each of said surfaces and successive portions of the flexible storage disk.

13. The stabilizing device of claim 12 wherein said first and second surfaces are concentric annular-shaped surfaces.

14. The stabilizing device of claim 12 wherein said static pressure releasing means comprises a notch in one of said first and second surfaces.

15. The stabilizing device of claim 14 wherein said notch ranges in size from a small notch to one-half of the total annular surface.

16. The stabilizing device according to claim 12 wherein said static pressure releasing means comprises a notch provided in both said first and second surfaces.

17. The stabilizing device of claim 16 wherein the notch in said first surface communicates with the region occupied by said transducer and surrounded by said first surface.

18. The stabilizing device of claim 14 wherein the depth of said notch is less than the depth of said groove.

19. The stabilizing device of claim 18 wherein the depth of said groove is in the range from 10 to 50 micrometers.

20. The stabilizing device of claim 14 wherein the depth of said notch is in the range from 10 to 30 micrometers.

21. A transducer-to-medium stabilizing device for assembly with a transducer in a recording and/or reproducing apparatus using a flexible storage disk as an information recording medium, comprising:

first means for supporting said transducer;

said transducer being positioned at a central location on said first means;

said first means having first and second annular surfaces substantially surrounding said transducer;

a groove separating said first and second surfaces;

said first and second surfaces developing a negative static pressure due to coaction with said flexible storage disk;

means for moving said first means in a predetermined substantially linear direction relative to said disk;

said first means being provided with static pressure releasing means at a location downstream relative to said direction of movement for releasing static pressure in said groove and preventing the formation of positive static pressure in the region between each of said surfaces and successive portions of the flexible storage disk; and said static pressure releasing means comprising a pair of diametrically opposed notches in one of said first and second annular surfaces.

22. A transducer-to-medium stabilizing device for assembly with a transducer in a recording and/or reproducing apparatus using a flexible storage disk as an information recording medium, comprising:

first means for supporting said transducer;

said transducer being positioned at a central location on said first means;

said first means having first and second surfaces substantially surrounding said transducer;

a groove separating said first and second surfaces;

said first and second surfaces developing a negative static pressure due to coaction with said flexible storage disk;

means for moving said first means in a predetermined substantially linear direction relative to said disk;

said first means being provided with static pressure releasing means at a location downstream relative to said direction of movement for releasing static pressure in said groove and preventing the formation of positive static pressure in the region between each of said surfaces and successive portions of the flexible storage disk;

said first and second surfaces being substantially flat and coplanar;

means for orienting said first means so as to tilt said first and second coplanar surfaces relative to the opposing surface of said flexible storage disk to form an angle therebetween which angle is a function of the rotating speed fo said disk; and the portion of said first means further removed from said flexible storage disk due to said tilted orientation being the downstream end thereof.

23. The stabilizing device of claim 22 wherein said tilting means comprises means for supporting the upstream end of said first means in a swingable fashion;

means adjacent the downstream end thereof for altering the position of said downstream end relative to said upstream end for tilting said first means.

24. The stabilizing device of claim 23 wherein said tilting means comprises a piezoelectric device responsive to an input signal for controlling the tilting angle of said first means.

25. The stabilizing device of claim 22 wherein said tilting means comprises a rotatable eccentric cam slideably engaging said first means at a downstream end thereof and means responsive to a speed signal for rotating said eccentric cam to the desired position.

26. The stabilizing device of claim 23 wherein the stabilizing device is oriented at an angle relative to the recording surface of the recording medium which is in the range of from 0.005 to 0.02 degrees.

* * * * *

UNITED STATES PATENT AND TRADEMARK OFFICE
CERTIFICATE OF CORRECTION

PATENT NO. : 4,998,175
DATED : March 5, 1991
INVENTOR(S) : Yoshimori et al.

It is certified that error appears in the above-identified patent and that said Letters Patent is hereby corrected as shown below:

```
Column 3, line 37, change "face" to --fact--
Column 4, line 49, change "envelop" to --envelope--
Column 7, line 6, change "substatially" to --substantially--
Column 7, line 21, change "a" to --an--
Column 8, line 20, delete first occurrence of "to"
Column 8, line 47, change "°µm" to --20 µm--
Column 9, line 6, change "rectlinear" to --rectilinear--
Column 9, line 30, change "atomospheric" to --atmospheric--
Column 10, line 42, change "perfiectly" to --perfectly--
Column 10, line 60, change "atomospheric" to --atmospheric--
```

Signed and Sealed this

Twenty-fourth Day of November, 1992

Attest:

DOUGLAS B. COMER

Attesting Officer

Acting Commissioner of Patents and Trademarks